(12) United States Patent
Wechlin et al.

(10) Patent No.: US 9,281,708 B2
(45) Date of Patent: Mar. 8, 2016

(54) DEVICE FOR INDUCTIVE TRANSMISSION OF ELECTRICAL ENERGY

(75) Inventors: Mathias Wechlin, Kandern (DE); Andrew Green, Malsburg-Marzell (DE)

(73) Assignee: CONDUCTIX-WAMPFLER GMBH, Weil am Rhein-Markt (DE)

( * ) Notice: Subject to any disclaimer, the term of this patent is extended or adjusted under 35 U.S.C. 154(b) by 755 days.

(21) Appl. No.: 13/383,859

(22) PCT Filed: Jun. 30, 2010

(86) PCT No.: PCT/EP2010/059294
§ 371 (c)(1),
(2), (4) Date: Mar. 30, 2012

(87) PCT Pub. No.: WO2011/006758
PCT Pub. Date: Jan. 20, 2011

(65) Prior Publication Data
US 2012/0181875 A1   Jul. 19, 2012

(30) Foreign Application Priority Data
Jul. 14, 2009  (DE) .......................... 10 2009 033 237

(51) Int. Cl.
*H02J 7/02*  (2006.01)
*B60L 3/00*  (2006.01)
*B60L 11/18*  (2006.01)

(52) U.S. Cl.
CPC . *H02J 7/025* (2013.01); *B60L 3/00* (2013.01); *B60L 11/182* (2013.01);
(Continued)

(58) Field of Classification Search
CPC .... H02J 7/025; B60L 11/182; B60L 11/1846; G01R 33/0023

USPC ......... 307/104; 320/108; 324/207.11–207.17, 324/207.26
See application file for complete search history.

(56) References Cited

U.S. PATENT DOCUMENTS

| 4,800,328 A | 1/1989 | Bolger et al. |
| 5,791,648 A * | 8/1998 | Hohl .............................. 273/238 |

(Continued)

FOREIGN PATENT DOCUMENTS

| CA | 1311269 | 12/1992 |
| DE | 3782281 T2 | 3/1993 |

(Continued)

OTHER PUBLICATIONS

Written Opinion dated Jan. 14, 2012 for PCT/EP10/59294 filed Jun. 30, 2010.

(Continued)

*Primary Examiner* — Jared Fureman
*Assistant Examiner* — Brett Squires
(74) *Attorney, Agent, or Firm* — Fleit Gibbons Gutman Bongini & Bianco PL; Paul D. Bianco

(57) ABSTRACT

A device for inductive transfer of electric energy from a stationary unit including at least one primary inductance to a vehicle that is adjacent to the unit and has at least one secondary inductance. The stationary unit has a device for detecting the presence of an electrically conductive object in a predetermined area that borders the primary inductance. The area can be between the primary and secondary inductance during the inductive energy transfer. The device has at least one measuring inductance, a measuring unit for measuring the impedance of the measuring inductance and an evaluation unit connected to the measuring unit. Preferably, the device is equipped with a plurality of measuring inductances which form a regular two-dimensional arrangement extending approximately in one plane, the plane lying perpendicular to the main direction of the magnetic field that is generated by the primary inductance during operation.

19 Claims, 2 Drawing Sheets

(52) U.S. Cl.
CPC ......... *B60L 11/1831* (2013.01); *Y02T 10/7005* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 5,821,731 A | 10/1998 | Kuki et al. | |
| 5,850,135 A | 12/1998 | Kuki et al. | |
| 6,954,180 B1 | 10/2005 | Braun et al. | |
| 7,076,206 B2 | 7/2006 | Elferich et al. | |
| 7,233,137 B2 * | 6/2007 | Nakamura et al. | 323/355 |
| 7,511,452 B2 * | 3/2009 | Bersenev | H02J 7/0044 |
| | | | 310/339 |
| 7,733,215 B2 | 6/2010 | Kozuma et al. | |
| 7,880,337 B2 | 2/2011 | Farkas | |
| 8,064,825 B2 | 11/2011 | Onishi et al. | |
| 8,222,991 B2 | 7/2012 | Kozuma et al. | |
| 8,446,251 B2 | 5/2013 | Kozuma et al. | |
| 2002/0154518 A1 | 10/2002 | Elferich et al. | |
| 2006/0202665 A1 * | 9/2006 | Hsu | 320/139 |
| 2007/0139000 A1 | 6/2007 | Kozuma et al. | |
| 2007/0145830 A1 | 6/2007 | Lee et al. | |
| 2008/0067874 A1 | 3/2008 | Tseng | |
| 2008/0200119 A1 | 8/2008 | Onishi et al. | |
| 2008/0265684 A1 | 10/2008 | Farkas | |
| 2010/0225172 A1 | 9/2010 | Kozuma et al. | |
| 2011/0163542 A1 | 7/2011 | Farkas | |
| 2011/0285210 A1 | 11/2011 | Lemmens et al. | |
| 2011/0291491 A1 | 12/2011 | Lemmens et al. | |
| 2012/0274151 A1 | 11/2012 | Kozuma et al. | |
| 2013/0241288 A1 | 9/2013 | Kozuma et al. | |

FOREIGN PATENT DOCUMENTS

| | | | |
|---|---|---|---|
| DE | 19915487 C1 | | 11/2000 |
| DE | 10119283 A1 | | 10/2002 |
| DE | 69714879 T2 | | 5/2003 |
| DE | 10 2007 033 654 A1 | | 4/2008 |
| JP | H06105408 | | 4/1994 |
| JP | 10198494 A | * | 7/1998 |
| JP | 10-215530 | | 8/1998 |
| JP | 2000134830 | | 5/2000 |
| JP | 2006149168 | | 6/2006 |
| JP | 2006246633 | | 9/2006 |
| JP | 2008017562 | | 1/2008 |
| JP | 2008206231 | | 9/2008 |
| WO | 2008032746 | | 3/2008 |
| WO | 2008/051611 A2 | | 5/2008 |
| WO | WO 2008050260 A1 | * | 5/2008 |
| WO | 2009014125 | | 1/2009 |
| WO | 2009/081115 A1 | | 7/2009 |

OTHER PUBLICATIONS

International Preliminary Report on Patentability dated Jan. 17, 2012 for PCT/EP10/59294 filed Jun. 30, 2010.

International Search Report published Oct. 3, 2011 for PCT/EP2010/059294 filed Jun. 30, 2010.

English translation of International Preliminary Report on Patentability (IPRP) published Jan. 17, 2012 for International Patent Application No. PCT/EP2010/059294 filed on Jun. 30, 2010.

English translation of Written Opinion (WO) published Jan. 14, 2012 for International Patent Application No. PCT/EP2010/059294 filed on Jun. 30, 2010.

* cited by examiner

DEVICE FOR INDUCTIVE TRANSMISSION OF ELECTRICAL ENERGY

FIELD OF THE INVENTION

The invention relates to a device for inductive transmission of electrical energy. Devices of this kind are used for inductive charging of a rechargeable battery installed in an electric vehicle. During the transmission of energy, a magnetic field of high field strength and flux density is built up between a stationary primary coil and a secondary coil on the vehicle. This is necessary in order to induce a sufficiently high current for the desired transmission power in the secondary coil.

BACKGROUND OF THE INVENTION

If objects made of metal materials are introduced into the area of such a field, eddy currents are induced in these which lead to heating dependent on the material, time of exposure and level of field strength. In the presence of such conditions, such an object can reach a temperature which can lead to damage, e.g. to melting of plastic surfaces, or to hazards to persons. The latter occur in particular when the secondary side has been removed and heated metal objects are freely accessible and can be touched by persons.

Due to the characteristics of existing applications for inductive energy transmission systems, such a hazard arising from metal foreign bodies was assessed as not being relevant or, for example in the case of industrial trucks (AGV) attempts were made to remove such objects from critical field areas by fitting brushes in front of the secondary consumers. In the case of vehicles with a driver, training can be conducted to draw attention to the need to look out for the presence of such objects while in operation and to ensure that these are removed before the inductive transmission is set in operation, or in the event of any doubt to ensure that the inductive transmission is not set in operation. The existing safety measures appear unsuitable or at least inadequate for largely automatic operation or with higher safety requirements which must be assumed in particular when such systems are used in areas accessible to the public.

From US 2007/0145830 A1 a system for the wireless transmission of electrical power to electronic devices is known, which comprises a plurality of primary coils, thereby eliminating the need for precise alignment of a primary and a secondary coil relative to each other. In this document, the problem of the presence of metallic objects is mentioned, but a metal detector is dismissed as being unusable. Rather, by suitable circuit design it is ensured that the system only enters its resonant state when a resonant circuit comprising a secondary coil and a tuning capacitor connected in parallel approaches the primary side, thereby causing a steep increase of the primary current, which is concentrated on one or a few primary coils immediately near the secondary coil. A conductive object represents no problem in this case, because it does not constitute a resonant circuit.

SUMMARY OF THE INVENTION

Therefore, the underlying object of the invention is to improve the operating safety of an inductive energy transmission system with regard to the presence of electrically conducting foreign bodies.

According to the invention, with a device for inductive transmission of electrical energy from a stationary unit with at least one primary inductor to a vehicle standing in the vicinity hereof and having at least one secondary inductor, the stationary unit has a device for detecting the presence of an electrically conducting object within a predetermined space adjoining the primary inductor. Primarily, this means the space lying between the primary inductor and the secondary inductor during the inductive transmission of energy. If the selected range of the detection device is increased, it is also possible to detect the presence of a vehicle in the area of the primary inductor in addition to the presence of conducting foreign bodies in the immediate vicinity of the primary inductor.

Preferably, a sensor is provided operating on an inductive basis, i.e. with an impedance measurement at a measuring inductor, since such as sensor is particularly suitable for discriminating between conducting and non-conducting objects. In the simplest case, the existing primary inductor can be used as the measuring inductor. A higher sensitivity and approximate location of the position of a metal object allows the use of a regular two-dimensional arrangement of a plurality of separate measuring inductors. These can be embodied for example as planar coils which can be manufactured inexpensively in large numbers on a common substrate.

An evaluation device compares the impedance of the measuring inductor or a distribution of the impedances of the individual measuring inductors or groups of measuring inductors with a reference impedance or reference distribution. In the presence of a deviation of a predetermined amount, a signal is produced which indicates the deviation. This signal can be produced on an indicating device and/or used to deactivate the current supply of the primary inductor.

BRIEF DESCRIPTION OF THE DRAWINGS

In the following, embodiment examples of the invention are described with reference to the drawings in which.

DETAILED DESCRIPTION OF THE INVENTION

Figure 1:
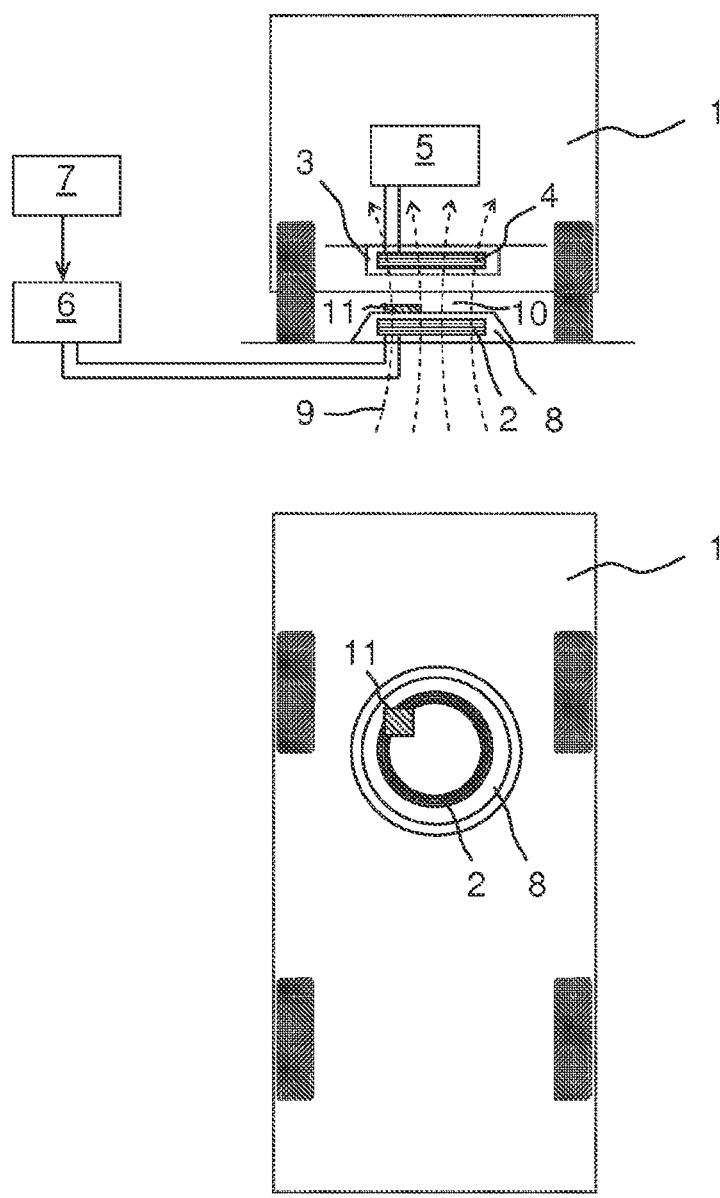
FIG. 1 shows a diagrammatic illustration of a charging station for inductive transmission of energy with an electric vehicle in a charging position.

FIG. 1 shows a diagrammatic sectional view (at the top) and a diagrammatic plan view (at the bottom) of an electric vehicle 1 standing over the primary coil 2 of a charging station to charge its battery. On the underside of the vehicle 1 in a housing 3 there is a secondary coil 4 which is connected to an electronic charging unit 5. This converts the parameters of the electric power transmitted inductively to the secondary coil 4 into suitable values for charging the battery of the vehicle 1. The primary coil 2 is fed by a current supply unit 6 of the charging station and is located in a housing 8 which is positioned statically in a vehicle parking bay. The current supply unit 6 is controlled by a control unit 7 of the charging station.

Some of the field lines 9 of the alternating magnetic field produced by the primary coil 2 while in operation are indicated by the dashed lines in FIG. 1. The main direction of the field is the direction of the coil axis of the primary coil 2 and thus the vertical direction. A high magnetic field strength and flux density prevails while in operation in the space 10 immediately above the housing 8 of the primary coil 2.

A metal object 11 lies on the housing 8 of the primary coil 2. This could have become detached from another vehicle which stood in the charging station before the vehicle 1 for example. It could also be an object lost by a person or an empty drinks can. Not least, the object 11 could also have been left there deliberately by a person with the intention of sabotage. As already explained at the start, the object would heat up due to the eddy currents induced in it when current is supplied to the primary coil 2 and thus become a source of danger. Moreover, it would reduce the efficiency of the energy transmission to the secondary coil 4.

How the present invention overcomes this problem is explained below with reference to FIG. 2. This shows a diagrammatic plan view of a charging station of the kind described with reference to FIG. 1 with a primary coil 2 in a housing 8 which is connected to a current supply unit 6. A plurality of measuring coils 12 are arranged in the housing 8 between its upper wall and the primary coil 2 in order to detect the metal foreign body 11. These measuring coils 12 are in each case much smaller than the primary coil 2. In the illustrated example they are of planar design and can be produced for example in the form of conductor tracks on a circuit board or a foil which is fastened to the upper wall of the housing 8 from the inside. The measuring coils 12 could also be embodied as conductor tracks running directly on the internal surface of the upper side of the housing 8.

The measuring coils 12 form a regular two-dimensional arrangement in the form of a matrix with equal grid spacing in the rows and columns. However, successive rows are in each case offset in relation to one another by half a grid space, so that a higher packing density can be obtained compared with a classic matrix arrangement. In FIG. 2 it appears that the leads to many measuring coils 12 run through other measuring coils 12, but this is not in fact the case. To avoid this in spite of the high packing density, the measuring coils 12 can in particular be distributed on two different sides of a circuit board or foil. In this respect, the illustration in FIG. 2 should be seen not as true to reality but as diagrammatic.

The measuring coils 12 are in each case connected with an impedance measuring device 13. These impedance measuring devices 13 are connected to a central evaluation device 14. When no energy transmission is taking place, but the charging station is on standby, the measuring coils 12 are supplied with a measuring current of predetermined strength. This produces a measuring field around each measuring coil 12, which produces eddy currents in a metal foreign body 11 lying on the housing 8 over the respective measuring coil. The magnetic reaction of these eddy currents on the measuring coil 12 concerned produces a change in the impedance. The impedance of each measuring coil 12 is measured continuously by the impedance measuring device 13 assigned to it in each case.

The measurement values supplied by the individual impedance measuring devices 13 are continuously compared with one another and when appropriate with a reference value in an evaluation device 14. In the situation illustrated in FIG. 2 in which a metal foreign body 11 at least partly covers four of the measuring coils 12, the four impedance measuring devices 13 assigned to these covered measuring coils 12 and marked in black in FIG. 2 supply impedance values to the evaluation device 14 which are different to those from the other impedance measuring devices 13 assigned to measuring coils 12 which are not covered. Here, the extent of the deviation in impedance depends not just on the conductivity and the form of the foreign body 11 but also on the individual extent of covering of a measuring coil 12 by the foreign body 11. In the situation shown in FIG. 2, one of the measuring coils 12 is almost completely covered by the foreign body 11, another is roughly half covered and two others are only covered to a lesser degree, with the result that the four impedance measuring devices 13 marked in black in FIG. 2 measure different changes of impedance.

Figure 2:
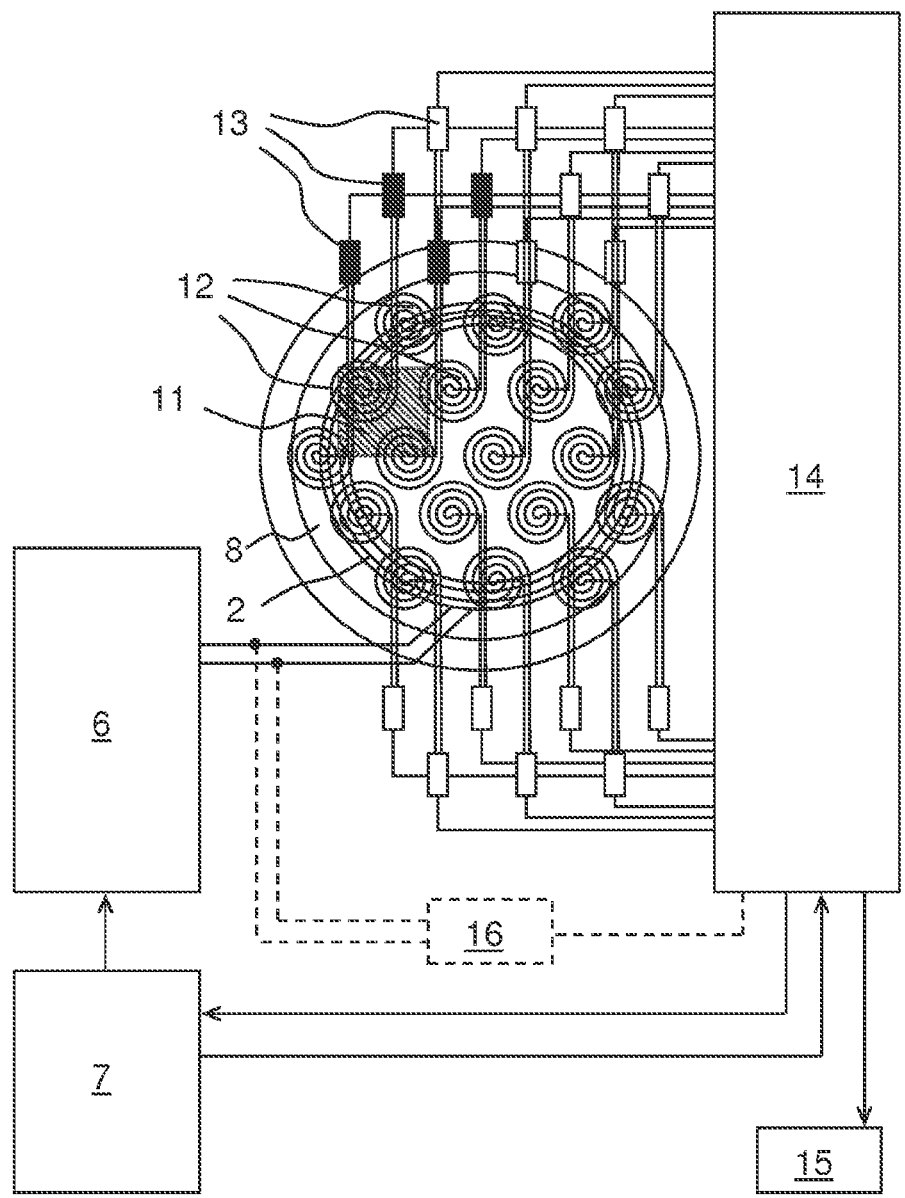
FIG. 2 shows a diagrammatic illustration of a sensor for detecting conducting foreign bodies according to the invention.

As an alternative to assignment of an individual impedance measuring device 13 to each individual measuring coil 12, as shown in FIG. 2, the measuring coils 12 could also be connected together in groups so that each group is assigned an impedance measuring device 13 which would measure the resulting total impedance of the group. In this way, fewer impedance measuring devices 13 would be required, but the local measurement resolution would be inferior.

As a further alternative, a plurality of measuring coils 12 or groups of such could be measured with one common impedance measuring device 13 by connecting an analogue multiplexer in series with the impedance measuring device 13. This would mean that even fewer impedance measuring devices 13 would be required, in principle just one. Naturally, multiplex operation would entail multiplication of the time required for complete detection of the impedances of all the measuring coils 12. However, this could still be acceptable as changing a vehicle at a charging station is not a very rapid operation.

Distributing a plurality of measuring coils 12 over the upper side of the housing 8 makes it possible to draw conclusions as to the size and the position of a metal object when the impedances of the measuring coils 12 are measured at least in groups or, as assumed in FIG. 2, individually. In addition, this increases the sensitivity as a relatively small foreign body 11, which for example only covers a single measuring coil 12 or a small group of these, causes a significant change in impedance with this measuring coil 12 or group, whereas with a single large measuring coil the measuring field of which would have to cover the entire upper side of the housing 8, it would only produce a comparatively small change in impedance which would be much more difficult to detect reliably.

Independently of the number of measuring coils 12 and their possible combination in groups, whenever the measured impedance distribution deviates from a stored reference distribution by a predetermined minimum amount, the evaluation device 14 always emits an output signal to an indicating device 15 which emits an optical and/or acoustic warning. Apart from this, the evaluation device 14 is also connected with the control unit 7 of the charging station and emits a signal to the latter which blocks the initiation of energy transmission, i.e. the supply of current to the primary coil 2. If the detected deviation from the specified state persists over an extended period of time, a message is sent to a competent location, e.g. to the operator of the charging station. The transmission of energy can only be set in operation again once the rectification of the faulty state has been confirmed by maintenance personnel.

As the measuring coils 12 are exposed to the strong magnetic field of the primary coil 2 when the inductive energy transmission is in operation, it is imperative to prevent high currents being induced in them as a result. For this, the impedance measuring devices 13 must be switched off before the beginning of the transmission of energy, and the measuring coils 12 must be switched to the open circuit state. To this end, the control unit 7 emits a corresponding signal to the evaluation device 14 which causes the measuring devices 13 to be switched off as indicated, and the measuring coils 12 to be switched to the open circuit state in good time before a primary current is switched on.

In a highly simplified variant compared with the form of embodiment of the invention previously described, the primary coil 2 is used as the single measuring coil. For this, the primary coil 2 is continuously supplied with a minimal current which is sufficient to build up a magnetic field of low strength as a measuring field around the primary coil 2. The impedance of the primary coil 2 is measured continuously by means of a suitable measuring device 16 which is shown by the dashed lines in FIG. 2. In this variant, the separate measuring coils 12 and the associated impedance measuring devices 13 are eliminated.

It is obvious that when the primary coil 2 is used as the single inductive measuring pickup, only comparatively coarse monitoring of the housing 8 for the presence of a metal foreign body 11 is possible, i.e. that only comparatively larger foreign bodies 11 can be detected reliably with this. Moreover, no conclusion as to the position of the foreign body 11 is possible from a change in the impedance of the primary coil 2, and only a limited conclusion as to its size. For this, the cost of additional hardware is much lower compared to the embodiment with a matrix of separate measuring coils 12 described previously.

In any case, when the strength of the measuring field and its physical extent are determined, it must be noted that it only covers a limited vertical range, for example to approx. 50 mm above the housing 8. This makes it possible to ensure that parking of a vehicle 1 above the housing 8 does not cause a change in the impedance of the measuring coils 12 or misinterpretation by the evaluation unit 14 as indicating the presence of a metallic foreign body 11. In addition, when the field strength of the measuring field is determined, it must be remembered that it must not be sufficient to heat a metal object 11 to such an extent that it could cause damage or danger.

In the case of the form of embodiment described first, the physical distribution of the impedance changes and/or their extent can also be used to detect the presence of a vehicle 1 over the primary coil 2 and differentiate between this and the presence of a metal foreign body 11. For the purposes of the present invention, a vehicle 1 including its secondary coil 4 represents no more than one specific type of metal object. In this case, the measuring field must be designed so that a larger vertical area can be monitored, for example up to approx. 300 mm above the housing 8. In this case, a signal sent by the evaluation device 14 to the control unit 7 indicates whether there is a foreign body 11 or a vehicle 1.

The recognition of a vehicle 1 reported by the evaluation unit 14 can be used by the control unit 7 for example to initiate the energy transmission operation. On the other hand, this can also be used to establish when an attempt is made to park a vehicle 1 not requiring charging in the charging station. In the last-named case, measures can then be taken to prevent the definitive parking of the vehicle 1 and so keep the charging option free for other vehicles which need a charge.

If a sufficient and lasting change in the impedance or impedance distribution is detected indicating the presence of a vehicle 1, contact can be made with the detected vehicle 1 for the purposes of identifying it more closely. This can be carried out for example by requesting a vehicle code by means of a transponder (RFID) or other suitable technical methods. At the same time, the communication with the vehicle is used to check whether and in what form there is a need and entitlement to draw energy at the charging station. When a vehicle is detected which has no need for energy transmission or no entitlement to this, the competent locations have the discretion to react appropriately to eliminate the blockage of the charging station. When a vehicle 1 is detected, but no communication can be established with it, the further action will be as in the case of detection of a foreign body 11.

The invention claimed is:

1. A device for inductive transmission of electrical energy from a stationary unit having at least one primary inductor to a vehicle in a vicinity thereof having at least one secondary inductor, the stationary unit comprising a control unit for controlling a current supply to the primary inductor, the device comprising:
   a plurality of measuring inductors positioned in at least one plane lying perpendicular to a main direction of a magnetic field produced by the primary inductor during transmission of electrical energy;
   at least one measuring device operatively-connected with the plurality of measuring inductors to measure a plurality of impedance values corresponding to different physical locations of the plurality of measuring inductors; and
   an evaluating device operatively-connected to the at least one measuring device, the evaluating device configured for
      comparing the measured impedance values with stored impedance values to determine a physical location of measuring inductors having impedance values which are different than the stored impedance values,
      detecting the presence of an undesired electrically-conducting object and a location of the undesired electrically-conducting object using the determined physical locations when the undesired electrically-conducting object partially covers the primary inductor,
      detecting the presence of the vehicle using the determined locations and the impedance values when the secondary inductor is positioned proximate the primary inductor, and
      causing the control unit to deactivate the current supply in the presence of the undesired electrically-conducting object.

2. The device according to claim 1, wherein the plurality of measuring inductors are planar coils.

3. The device according to claim 1, wherein the plurality of measuring inductors are arranged in a form of a grid pattern.

4. The device according to claim 1, wherein the plurality of measuring inductors are arranged in successive rows each offset in their longitudinal direction by half a grid spacing of a row.

5. The device according to claim 1, wherein the plurality of measuring inductors are connected together in groups such that each of the plurality of impedances corresponds to a group.

6. The device according to claim 5, wherein each group of measuring inductors is operatively-connected to a unique measuring device.

7. The device according to claim 1, wherein each of the plurality of measuring inductors is operatively-connected to a unique measuring device.

8. The device according to claim 1, wherein the plurality of measuring inductors are connected through a multiplexer connected to a common impedance measuring device.

9. The device according to claim 1, further comprising an indicating device connected to the evaluating device, the indicating device generating a warning signal in the presence of the undesired electrically-conducting object.

10. A safety device for use in a system of inductive transmission of electrical energy from a stationary unit having at least one primary inductor to a vehicle having at least one secondary inductor, the device comprising:
   a plurality of measuring inductors positioned in at least one plane lying perpendicular to a main direction of a magnetic field produced by the primary inductor during transmission of electrical energy;
   at least one measuring device operatively-connected with the plurality of measuring inductors to measure a plurality of impedance values corresponding to different physical locations of the plurality of measuring inductors; and an evaluating device operatively-connected to the at least one measuring device, the evaluating device configured for comparing the measured impedance values with stored impedance values to determine a physical location of measuring inductors having impedance values which are different than the stored impedance values, detecting the presence of an undesired electrically-conducting object and a location of the undesired electrically-conducting object using the determined physical locations and the impedance values when the undesired electrically-conducting object partially covers the primary inductor, detecting the presence of the vehicle using the determined locations and the impedance values when the secondary inductor is positioned proximate the primary inductor, and causing the control unit to deactivate the current supply in the presence of the undesired electrically-conducting object.

11. The device of claim 10, wherein the plurality of measuring inductors are coils.

12. The device of claim 10, wherein the plurality of measuring inductors are distributed upon a surface of a housing containing the primary inductor.

13. The device of claim 10, wherein the plurality of measuring inductors are connected together in groups wherein each of the plurality of impedances corresponds to a group.

14. The device of claim 10, wherein the plurality of measuring inductors are connected through a multiplexer connected to an impedance measuring device.

15. The device of claim 10, wherein the undesired electrically-conducting object is at least one of refuse, debris, and an article of sabotage.

16. The device of claim 10, wherein the plurality of measuring inductors are arranged in a form of a grid pattern.

17. A method of improving safety in the use of a system of inductive transmission of electrical energy from a stationary unit having at least one primary inductor to a vehicle having at least one secondary inductor, the method comprising:

positioning a plurality of measuring inductors in at least one plane lying perpendicular to a main direction of a magnetic field produced by the primary inductor during transmission of electrical energy;

operatively-connecting at least one measuring device with the plurality of measuring inductors to measure a plurality of impedance values corresponding to different physical locations of the plurality of measuring inductors; and operatively-connecting an evaluating device to the at least one measuring device and the evaluating device comparing the measured impedance values with stored impedance values to determine a physical location of measuring inductors having impedance values which are different than the stored impedance values, detecting the presence of an undesired electrically-conducting object and a location of the undesired electrically-conducting object using the determined physical locations when the undesired electrically-conducting object partially covers the primary inductor, detecting the presence of the vehicle using the determined locations and the impedance values when the secondary inductor is positioned proximate the primary inductor, and causing the control unit to deactivate the current supply in the presence of the undesired electrically-conducting object.

18. The method of claim 17, wherein the plurality of measuring inductors are distributed upon a surface of a housing containing the primary inductor.

19. The method of claim 17, wherein the undesired electrically-conducting object is at least one of refuse, debris, and an article of sabotage.

* * * * *